United States Patent
Winget, Jr. et al.

(10) Patent No.: US 10,449,828 B2
(45) Date of Patent: Oct. 22, 2019

(54) SYSTEM FOR CONTROLLING AIR FLOW INTO THE PASSENGER COMPARTMENT OF A VEHICLE

(71) Applicant: ValTec, LLC, Imlay City, MI (US)

(72) Inventors: Larry J. Winget, Jr., Dryden, MI (US); Peter G. VanHeusden, Bloomfield Hills, MI (US)

(73) Assignee: ValTec, LLC, Imlay City, MI (US)

( * ) Notice: Subject to any disclaimer, the term of this patent is extended or adjusted under 35 U.S.C. 154(b) by 1068 days.

(21) Appl. No.: 14/278,336

(22) Filed: May 15, 2014

(65) Prior Publication Data

US 2015/0328958 A1    Nov. 19, 2015

(51) Int. Cl.
*B60H 1/34*    (2006.01)
*B60H 1/00*    (2006.01)

(52) U.S. Cl.
CPC ..... *B60H 1/00871* (2013.01); *B60H 1/00742* (2013.01); *B60H 1/345* (2013.01); *B60H 1/3414* (2013.01); *B60H 2001/3471* (2013.01)

(58) Field of Classification Search
CPC ............ B60H 1/00871; B60H 1/00742; B60H 1/3414; B60H 1/345; B60H 2001/3471
USPC ........................................................ 454/155
See application file for complete search history.

(56) References Cited

U.S. PATENT DOCUMENTS

| | | | |
|---|---|---|---|
| 4,352,321 A | 10/1982 | Fukui et al. | |
| 6,009,934 A | 1/2000 | Sunaga et al. | |
| 6,347,987 B1 * | 2/2002 | Ichishi | B60H 1/247 454/153 |
| 6,386,965 B1 * | 5/2002 | Greenwald | B60H 1/00742 165/41 |
| 6,697,721 B2 * | 2/2004 | Arlinsky | B60K 35/00 345/7 |
| 6,830,511 B2 | 12/2004 | Gehring et al. | |
| 6,837,786 B2 * | 1/2005 | Linde | F24F 13/082 454/256 |
| 7,195,555 B2 | 3/2007 | Gehring et al. | |
| 7,455,581 B2 * | 11/2008 | Gehring | B60H 1/3428 454/155 |
| 7,656,393 B2 | 2/2010 | King et al. | |
| 7,681,630 B2 | 3/2010 | Klassen et al. | |

(Continued)

FOREIGN PATENT DOCUMENTS

DE    102011084439 A1    4/2013
EP         2505397 A1    3/2012

*Primary Examiner* — Helena Kosanovic
(74) *Attorney, Agent, or Firm* — Brooks Kushman P.C.

(57) ABSTRACT

A system for controlling air flowing into a passenger compartment of a vehicle is provided. The system includes an air outlet assembly including a housing having an airway and one or more air-directing members mounted for movement within the airway. An actuator assembly moves each air-directing member in the airway. A discrete, touch-sensitive surface area functions as a user touch interface control. A touch sensor detects a touch input when a person is touching the surface area or is close to touching the surface area. Control logic is operative to determine a desired value for the position of each air-directing member in the airway as a function of the detected touch input and generates a position control signal based on the desired value. The actuator assembly moves its air-directing member to a desired position in the airway based on the position control signal.

22 Claims, 7 Drawing Sheets

(56) References Cited

U.S. PATENT DOCUMENTS

| | | | |
|---|---|---|---|
| 8,057,288 B2 * | 11/2011 | Konet | B60H 1/3428 454/152 |
| 8,210,913 B2 | 7/2012 | Demarino et al. | |
| 8,477,114 B2 | 7/2013 | Miller et al. | |
| 8,610,674 B2 | 12/2013 | Pryor | |
| 2006/0052907 A1 * | 3/2006 | Hein | B60K 37/06 701/1 |
| 2010/0291853 A1 | 11/2010 | Koshobu | |
| 2013/0078900 A1 | 3/2013 | Zalan | |

* cited by examiner

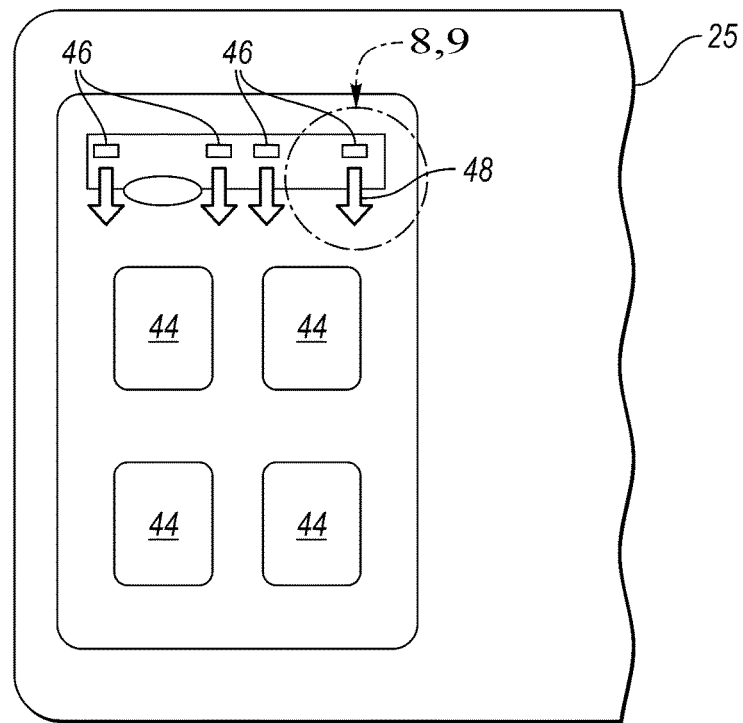
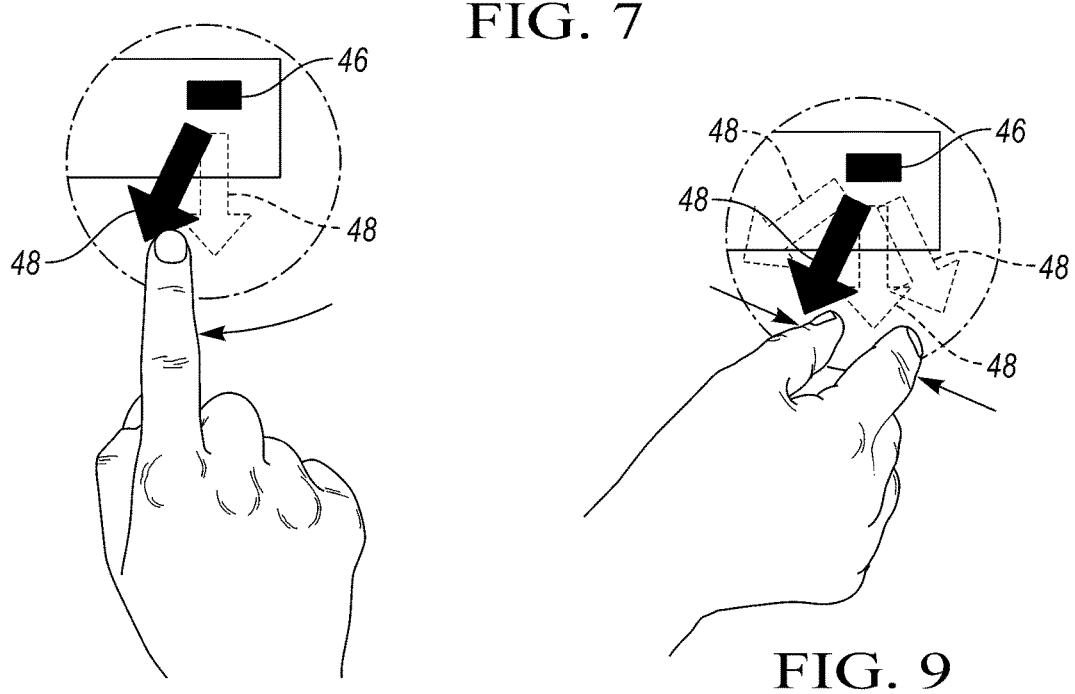
FIG. 7
FIG. 8
FIG. 9

SYSTEM FOR CONTROLLING AIR FLOW INTO THE PASSENGER COMPARTMENT OF A VEHICLE

TECHNICAL FIELD

At least one embodiment of the invention generally relates to systems for controlling air flowing into passenger compartments of vehicles.

OVERVIEW

As described in U.S. Pat. No. 6,386,965, conventional vehicle interiors include airflow systems for driver and passenger comfort. These airflow systems typically deliver air into the interior of a vehicle by means of air outlet members which are suitably positioned within the vehicle interior to provide a comfortable climate for the occupants of the vehicle. For example, air outlet members may be provided on the face of the dashboard or on the vehicle doors. The air outlet members are connected directly or indirectly to one or more air ducts or airways which serve as the air-carrying members. The air outlets are generally configured to be manually controllable with, for example, control knobs, such as thumbwheels, which are designed to allow air to flow through the air outlet members and prevent air from flowing depending upon the precise setting of the air outlet member. The air outlet members also typically include directional vanes which serve to direct the airflow. Typically, one or more air outlet members are provided on the driver side and one or more air outlet members are provided on the passenger side of the vehicle interior so that the entire vehicle interior may be efficiently climate controlled for the comfort of the occupants. Additionally, many vehicle interiors include rear passage seats. In this instance, many airflow systems include one or more air outlet members suitably positioned to deliver air to passengers in the rear seat.

Oftentimes, only a driver is in the vehicle and the driver desires additional airflow. Conventionally, this is accomplished by adjusting the thumbwheels for the air outlet members and/or adjusting the directional vanes. For example, the driver may close the air outlet members which are not designed to provide direct airflow to the driver and/or the driver may adjust the directional vanes to change the direction of the airflow. Both of these techniques require manual adjustment of the air outlets and this requires effort because some of the air outlet members are distally located from the driver's seating area. Thus, the driver will have to be in a stationary position to properly adjust these distally located air outlets. The manual adjustment of the air outlets likewise requires the driver to spend additional time to adjust the climate control system in an effort to provide a more comfortable driving environment.

U.S. Pat. No. 6,386,965 discloses an automatic airflow system for a vehicle interior whereby air is automatically directed to the regions of the interior passenger compartment where occupants are seated. This is accomplished generally by including occupant sensing devices within the vehicle interior. When the sensing devices detect the presence of a body, a closing means such as a door behind appropriate air outlet members is opened thereby allowing air to flow through these outlet members and into the vehicle interior where one or more occupants are seated.

Many current passenger vehicles have as a standard feature multiple air outlet devices in the area of the instrument panel which are provided for controlling the temperature of the upper body and head area of the driver and front passenger. In many vehicles, the air outlet devices have multiple horizontal louvers situated one on top of the other and multiple vertical louvers situated next to one another, the positions of which are adjustable in each case by a movably, pivotably, or rotatably situated actuating element which may have a knob- or plate-like design, for example. The actuating element is usually situated in the center of the air outlet device, which, from a design standpoint, is not considered optimal, and which may also result in influencing the flow characteristic of the air flowing out from the air outlet device.

As described in U.S. Pat. No. 7,195,555, air duct outlets are conventionally designed to allow the passage of a large amount of air so that the cabin of a vehicle can be cooled/heated as rapidly as possible. However, passengers typically can tolerate relatively high airflow rates only for a limited time before starting to feel uncomfortable. This problem has been addressed by the use of oscillating air duct outlets wherein the oscillation of a set of louvers cause an air stream flowing therethrough to oscillate or sweep back and forth such that a passenger experiences direct airflow only for limited durations.

One known oscillating air duct outlet uses a small, dc motor (geared down to low rotational speed) to drive a crank which, through a shaft, mechanically moves air-directing louvers back and forth in an oscillating pattern, thereby imparting a sweeping motion to an air stream.

Unfortunately, the use of motors and associated rotational linkages to generate oscillating air stream motion can be somewhat complicated and expensive. Vehicle manufacturers are continuously seeking components, such as air duct outlets, that have enhanced functionality (such as oscillation capability) and durability, yet are cost effective to manufacture. Vehicle manufacturers are also continuously seeking components, such as air duct outlets, that enhance styling within a vehicle, yet remain functional and economical.

Published U.S. Patent Application 2013/0078900 discloses a vehicle air vent that includes a plurality of air control vanes, the orientation of which determines the direction of airflow exiting the air vent; a shut-off door that allows air to flow through the air vent when it is in a second position; a control tab mechanically coupled to the plurality of air control vanes; and a linkage assembly mechanically coupling the control tab to the shut-off door. Adjustment of the control tab within a first range of positions controls the orientation of the air control vanes while maintaining the shut-off door in an open position. Adjustment of the control tab within a second range of positions, however, moves the shut-off door between the first and second positions, thereby controlling airflow through the air vent.

U.S. Pat. No. 6,830,511 discloses air duct outlets with remotely-located joystick louver controls. A louver assembly is operably coupled with a housing and a set of louvers and pivotally secured within the housing in spaced-apart adjacent relationship. A servomotor is operably coupled with the louvers, wherein the servomotor is configured to cause pivotal movement of the louvers in response to selected user movement of the joystick.

U.S. Pat. No. 8,610,674, assigned on its face to Apple Inc., discloses programmable tactile touch screen displays and man-machine interfaces for improved vehicle instrumentation and telematics.

U.S. Pat. No. 8,477,114, also assigned on its face to Apple Inc., discloses display devices and methods for operating the same. In one embodiment, the display device has an electronic display having an active area for presenting visual content; a housing holding the electronic display and having an opening allowing a person to view a first portion of the active area; and a bezel about the opening, the bezel covering a second portion of the active area and providing a window through which at least a part of the second portion can be viewed. A sensor system senses when a person is close to touching the bezel or when a person is in touch with the bezel and generates a sensor signal; and a controller is operable to adjust the appearance of the active area in the part of the second portion when the controller determines that a person has touched the bezel or is close to touching the bezel.

U.S. Pat. No. 7,656,393, also assigned on its face to Apple Inc., discloses another option in which a display is positioned on the electronic device and having a perimeter or bezel; at least one touch sensitive surface is positioned on the electronic device adjacent at least a portion of the perimeter of the display; and processing circuitry is connected to the display and the touch sensitive surface. Within this device, the processing circuitry designates at least one area of the at least one touch sensitive surface for at least one control; generates at least one visual guide for the at least one control; and presents the at least one visual guide for display at a location on the display adjacent the at least one area designated for the at least one control. The visual guide is located on the display inside the bezel but indicates a touch-sensitive surface that is located on the bezel.

There are a variety of touching sensing technologies, including capacitance, resistive, acoustic, optical, embedded and force sensing. Capacitive sensing is a technology, based on capacitive coupling that takes human body capacitance as input. Capacitive sensors detect anything that is conductive or has a dielectric different from that of air.

There are two types of capacitive sensing system: mutual capacitance, where the object (finger, conductive stylus) alters the mutual coupling between row and column electrodes, which are scanned sequentially, and self- or absolute capacitance where the object (such as a finger) loads the sensor or increases the parasitic capacitance to ground. In both cases, the difference of a preceding absolute position from the present absolute position yields the relative motion of the object or finger during that time.

Projected capacitive touch (PCT) technology is a capacitive technology which allows accurate and flexible operation, by etching a conductive layer. An X-Y grid is formed either by etching one layer to form a grid pattern of electrodes, or by etching two separate, perpendicular layers of conductive material with parallel lines or tracks to form the grid; comparable to the pixel grid found in many liquid crystal displays (LCD).

The greater resolution of PCT allows operation with no direct contact, such that the conducting layers can be coated with further protective insulating layers, and operate even under screen protectors, or behind weather and vandal-proof glass. Because the top layer of a PCT may be glass, PCT is a more robust solution versus resistive touch technology. Depending on the implementation, an active or passive stylus can be used instead of or in addition to a finger. This is common with point of sale devices that require signature capture. Gloved fingers may or may not be sensed, depending on the implementation and gain settings. Conductive smudges and similar interference on the panel surface can interfere with the performance. Such conductive smudges come mostly from sticky or sweaty finger tips, especially in high humidity environments. Collected dust, which adheres to the screen because of moisture from fingertips can also be a problem.

The following patent documents are also related to at least one embodiment of the present invention: U.S. Pat. Nos. 4,352,321; 6,009,934; 6,347,987; 7,681,630; and 8,210,913, U.S. publication 2010/0291853; German Patent Application No. DE 10 2011084439 A1; and European Patent Application No. EP 2505397 A1.

Despite the above patent documents, there is still a need for a system to control air flowing into a passenger compartment of a vehicle, the system compensating for gloved fingers, conductive smudges, collected dust, finger size and generally, extreme environmental conditions existing within automatic interiors for a wide variety of air outlet assemblies.

Other technical advantages will be readily apparent to one skilled in the art from the following figures, descriptions and claims. Moreover, while specific advantages have been enumerated, various embodiments may include all, some or none of the enumerated advantages.

SUMMARY OF EXAMPLE EMBODIMENTS

An object of at least one embodiment of the present invention is to provide a system for controlling air flowing into a passenger compartment of a vehicle.

In carrying out the above object and other objects of at least one embodiment of the present invention, a system for controlling air flowing into a passenger compartment of a vehicle is provided. The system includes an air outlet assembly including a housing having an airway for fluidly communicating air into the passenger compartment and at least one air-directing member mounted for movement within the airway and configured to direct a flow of air into the passenger compartment based on position of the at least one member in the airway. The system includes an actuator assembly coupled to the at least one air-directing member to move the at least one air-directing member in the airway. A discrete, touch-sensitive surface area functions as a user touch interface control. A touch sensor is associated with the surface area and is configured to detect a touch input when a person is touching the surface area or is close to touching the surface area. Control logic is operative to determine a desired value for the position of the at least one member in the airway as a function of the detected touch input and to generate a position control signal based on the desired value. The actuator assembly moves the at least one air-directing member to a desired position in the airway based on the position control signal.

The touch-sensitive surface area may be adjacent the airway.

The housing may include a bezel having an opening aligned with the airway and through which the air flows and wherein the touch-sensitive surface area may form a portion of an outer surface of an bezel.

The bezel may at least partially surround the airway.

The touch sensor may be located within the bezel.

The at least one air-directing member may include a vane-like or louver-like air-directing member.

The air outlet assembly may include a plurality of substantially horizontal air-directing members and a plurality of substantially vertical air directing members substantially perpendicular with respect to the horizontal air-directing members.

A first actuator assembly may be coupled to the horizontal air-directing members and a second actuator assembly may be coupled to the vertical air-directing members.

A first discrete, touch-sensitive surface area may function as a first touch interface control for the first actuator assembly and a second discrete, touch-sensitive surface area may function as a second touch interface control for the second actuator assembly. A memory device for storing a plurality of activation schemes of the air outlet assembly may be provided.

At least one of the activation schemes may be an oscillating mode of the air outlet assembly wherein the air outlet assembly oscillates the flow of air.

A memory device for storing a predetermined desired value for the position of the at least one air-directing member for a passenger of the vehicle may be provided wherein the control logic generates a position control signal based on the predetermined desired value.

The air outlet assembly may include a door mounted for movement within the airway between open and closed positions.

A third actuator assembly may be coupled to the door wherein a third discrete, touch-sensitive surface area functions as a third touch interface control for the third actuator assembly.

The detected touch input may be a gesture.

The touch sensor may be integrated within an instrument panel of the vehicle.

The control logic may determine a desired value of the position of the at least one member in the airway as a function of a signal received by the control logic from a steering wheel control.

The control logic may determine a desired value for the position of the at least one member in the airway as a function of a signal received from a remote electronic control unit.

The actuator assembly may include a closed-loop servomotor for driving the at least one member.

The actuator assembly may include a sensor coupled to the servomotor to provide position feedback as a function of the position of the at least one air-directing member. The control logic may control the motor based on a position control signal.

A sensor may be provided to generate a signal based on an initial position of the air-directing member wherein the actuator assembly may move the at least one air-directing member from the initial position to the desired position.

Yet still further in carrying out the above object and other objects of at least one embodiment of the present invention, a system for controlling air flowing into a passenger compartment of a vehicle is provided. The system includes a plurality of air outlet assemblies. Each of the assemblies including a housing having an airway for fluidly communicating air into the passenger compartment and at least one air-directing member mounted for movement within the airway and configured to direct a flow of air into the passenger compartment based on position of the at least one member in the airway. An actuator assembly is coupled to each air-directing member to move its air-directing member in its airway. A plurality of discrete, touch-sensitive surface areas which function as user touch interface controls, are provided. A touch sensor is associated with each surface area and is configured to detect a touch input when a person is touching one of the surface areas or is close to touching one of the surface areas. Control logic is operative to to determine a desired value for the position of at least one member in its airway as a function of a detected touch input and generates a position control signal based on the desired value. Each actuator assembly moves at least one air-directing member to a desired position in its airway based on its position control signal wherein the air outlet assemblies are independently controlled by the control logic.

At least a portion of the control logic may be linked to the actuator assemblies through a vehicle-based bus.

The user touch interface controls may function as a gesturing graphical user interface including icons which represent a plurality of different seating areas and a plurality of different air outlet assemblies for the vehicle.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIG. 7 is a view, partially broken away, of yet another user interface with icons which represent a steering wheel, vehicle seats, air outlet assemblies and air flowing from the assemblies;

FIG. 8 is an enlarged view from the circled area of FIG. 7, partially broken away, showing a possible user-icon touch interaction;

FIG. 9 is a view similar to the view of FIG. 8, from the circled areas of FIG. 7, showing a different user-icon touch interaction;

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in this application, the phrase "air outlet assembly 13" includes, in particular, so-called "air outlet grills" which have multiple, essentially horizontally extending horizontal louvers, and vertical louvers situated next to one another and essentially perpendicularly with respect to the horizontal louvers. However, the term "air outlet assembly" is not limited to air outlet grills of this type, and also includes other types of air outlet assemblies, in particular so-called "ball vents." The term also includes air outlet assemblies in which the air flows out through a plurality of honeycomb-shaped or tube-like elements.

The air outlet assemblies may be integrated into an instrument panel 15 of a vehicle, for example. They may also be situated in a vehicle door, in the area of a roof side member, in a center console of the vehicle, or in the roof area of the vehicle, and may be associated with the front and/or the rear seats of the passenger compartment.

The at least one air directing member may, in particular, be a louver-like air directing member. The term "air directing member" is generally understood to mean an element which influences the direction in which the air flows out from the air outlet assembly.

A control circuit or "smart" controller 24 of the system may include an electronic memory device in which at least one "configuration" (i.e. activation scheme) of the air outlet assembly, is storable. The term "configuration" may be understood to mean, for example, a certain air directing member position and/or one or more associated damper door positions of the vehicle ventilation or air conditioning system. By reading out the at least one stored configuration and correspondingly controlling the at least one actuator assembly, the air outlet assembly may be switched into a state which corresponds to the stored configuration, which means, for example, that the at least one air directing member is moved into one or more positions associated with the stored configuration or activation scheme.

Figure 3:
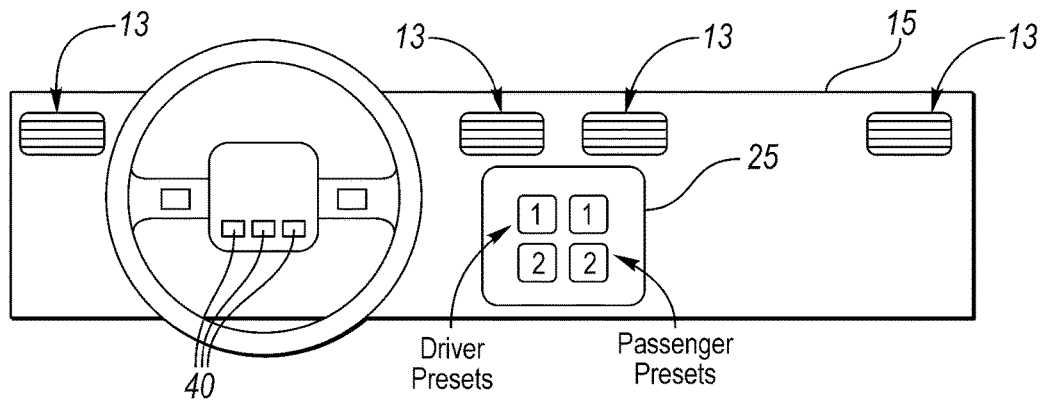
FIG. 3 is a schematic view, similar to the view of FIG. 1, showing driver and passenger airflow presets.

The stored configuration may be retrievable by means of a "mobile electronic device," or remote control unit, in particular, a device which is suitable for opening and closing the vehicle and/or which is necessary for starting an engine of the vehicle. In particular, a "vehicle key 42" which is equipped with an appropriate electronics system is suitable as a mobile electronic device. In this way, different configurations of the air outlet assemblies may be stored, i.e., configured and saved, for different drivers. For example, it may be provided that when the vehicle is opened or started using a key of driver X, the air outlet assembly is switched into a state that has been preconfigured by driver X, and when the vehicle is opened or started using a key of a driver Y, the air outlet assembly is switched into a state that has been preconfigured by driver Y. Multiple individual settings or "presets" as shown in FIG. 3 may thus be stored and retrieved from the memory device.

It is also conceivable to store a certain configuration of an air outlet assembly Y on a "smart phone" or mobile telephone, transmit the configuration to the vehicle electronics system via a wireless connection or a Bluetooth interface, and use the configuration for adjusting the air outlet assembly.

As used herein, a primary/main vehicle controller or system controller 28 (i.e. FIGS. 12 and 14) typically has a microprocessor, called a central processing unit (CPU), in communication with memory management unit (MMU). MMU controls the movement of data among the various computer readable storage media and communicates data to and from CPU. The computer readable storage media preferably include volatile and nonvolatile storage in read-only memory (ROM), random-access memory (RAM), and keep-alive memory (KAM). For example, KAM may be used to store various operating variables while CPU is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU in controlling the engine or vehicle into which the engine is mounted.

The computer-readable storage media may also include floppy disks, CD-ROMs, hard disks, and the like. CPU communicates with various sensors and actuators directly or indirectly via an input/output (I/O) and actuators directly or indirectly via an input/output (I/O) interface or vehicle bus (i.e. CAN, LIN, etc.). Interface may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU. Examples of items that may be actuated under control of CPU, through I/O interface, are fuel injection timing, fuel injection rate, fuel injection duration, air-directing member position, spark plug ignition timing (for spark-ignition engines), and others. Sensors communicating input through I/O interface may be indicating air-directing member position, engine rotational speed, vehicle speed, coolant temperature, intake manifold pressure, accelerator pedal position, door position, air temperature, exhaust temperature, exhaust air to fuel ratio, exhaust component concentration, and airflow, for example. Some controller architectures do not contain an MMU. If no MMU is employed, CPU manages data and connects directly to ROM, RAM, and KAM coupled to MMU or CPU depending upon the particular application.

The various components or functions of a "smart" controller 24 (i.e. FIGS. 14 and 15) may be implemented by a separate controller as illustrated, or may be integrated or incorporated into the main controller, or other controller, depending upon the particular application and implementation. Each "smart" controller 24 may include control logic to control its actuator assembly or assemblies. The control logic, may be implemented in hardware, software, or a combination of hardware and software.

As will be appreciated by one of ordinary skill in the art, one or more memory devices within the main controller and/or the "smart" controller may store a plurality of activation schemes for the air outlet assemblies and may represent any one or more of a number of known processing strategies such as event-driven, interrupt-driven, multi-tasking, multi-threading, and the like. As such, various steps or functions may be performed in sequence, in a modified sequence, in parallel, or in some cases omitted. Likewise, the order of operation or processing is not necessarily required to achieve the objects, features, and advantages of the invention, but is provided for ease of illustration and description.

Although not explicitly illustrated, one of ordinary skill in the art will recognize that one or more of the illustrated steps or functions may be repeatedly performed depending upon the particular application and processing strategy being used. Preferably, the control logic is implemented primarily in software executed by a microprocessor-based controller. Of course, the control logic may be implemented in software, hardware, or a combination of software and hardware depending upon the particular application. When implemented in software, the control logic is preferably provided in a computer-readable storage medium having stored data representing instructions executed by a computer to control one or more components of the outlet assemblies through the actuator assemblies 13. The computer-readable storage medium or media may be any of a number of known physical devices which utilize electric, magnetic, and/or optical devices to temporarily or persistently store executable instructions and associated calibration information, operating variables, and the like.

In one example embodiment, each of a set of horizontal vanes 10, a set of vertical vanes 12 and a damper door 32 (FIG. 12) is electrically driven by a separate actuator assembly 20, including a linear or rotary actuator such as a servomotor 22 and associated transmission 40. The door 32 may not need a transmission. The servomotors 22 may be, for example, brushless DC servomotors, the operations of which are controlled by a control circuit or the "smart" controller 24 via motor drivers (such as H bridge, motor drivers) within the controller 24. The brushless motors 22 may have their rotary speed and position controlled by pulse width modulation (PWM) control so that the amount and direction of air flowing into the passenger compartment is adjusted.

The main controller 28 typically includes computer hardware including a CPU, a ROM, a RAM and the like. A group of sensors (not shown) and a group of switches (not shown) are typically connected to the controller 28. The main controller 28 may be configured to perform, for example, various control strategies by execution of a ventilation control program stored in a built-in ROM (not shown). The controller 28 may also control temperature of the air flowing into the passenger compartment by controlling one or more heating elements 30 through temperature drivers. The controllers 24 and 28 may control the opening angle of the damper door 32 based on the input information of the airflows of an air-flow setting switch or touch control 18 so that inside airflow approaches a set airflow. The "smart" controller 24 outputs servomotor drive commands to the servomotors 22 based on outputs from encoders 26 and decoded commands from the controller 28. The controller 24 controls the servomotors 22 through drivers of the controller 24 and transmissions 40 so that the positions of the vanes 10 and 12 and the door 32 are changed.

The main controller 28 outputs servomotor drive commands to the controller 24, which controls the servomotors 22 through transmissions 40 so that the sets of vanes 10 and 12 are switched to various air directing positions.

The main controller 28 and each of the "smart" controllers 24 are connected via a vehicle bus (FIG. 14) such as a local interconnect network (LIN) line capable of two-way communications. LIN is one of many possible in-vehicle local area network (LAN) communications protocols. A power line (+B) and a ground line (GND) are common between the main controller 28 and the "smart" motor controllers 24.

Each "smart" controller 24 typically includes a LIN transceiver interface, a microprocessor and its control logic, motor drivers, and an electric power source. The "smart" controller 24 may be integrated or physically coupled via the transmissions 40 with the servomotors 22, while the controller 28 is provided away from the servomotors 22.

The power source of each "smart" controller 24 supplies electric power of a predetermined voltage level from the power line (+B) to each part of the controller 24 and the motor drivers. The LIN transceiver is a communications interface circuit connected to the LIN network bus for communications and operates as a receiver section and a transmitter section. The motor drivers typically includes the driver circuits for driving the servomotors 22.

An absolute encoder 26 may be provided near or is coupled to the rotary output shaft of each servomotor 22 or near or coupled to each transmission 40 (which mechanically couple the output shafts of the motors 22 with the sets of vanes 10 and 12) and are driven in synchronism with the rotation of the servomotors 22 to generate pulse signals. The encoders may include a conventional rotary encoder and wave shaper circuit. The absolute encoders 26 generate from its wave shaper circuit (not shown) the pulse signals. These pulse signals are applied to a logic circuit. Pulse signals P1 and P2 are typically produced from the wave shaper circuit in two combination patterns, which are different from each other in accordance with the direction of motor rotation. The pulse signals, P1 and P2, are out of phase in different manner in accordance with the direction of motor rotation. Each absolute encoder 26 may operate as a rotation position detection section.

Each "smart" controller 24 includes a memory and may be configured as a conventional microcomputer including a CPU, a ROM, a RAM and the like or as a hardwired logic circuit. The controller 24 may be configured to operate as a drive control section, a rotation position change detection section, an operation limit check section, a sampling section and a position comparison section.

The main controller 28 and each "smart" controller 24 may perform data communications regularly through the LIN bus. In such data communications, the "smart" controllers 24 may transmit state data indicating the state of the servomotors 22 to the main controller 28. The state data may include a present rotation position of each servomotor 22, that is, count value of a rotation position counter stored in the memory of the "smart" controllers 24.

The main controller 28 and/or the "smart" controllers 24 may confirm the present rotation position of the servomotors 22. The main controller 28 then may set a target stop position of the servomotors 22 based on various states detected by the sensors (optional), user touch commands and the present rotation positions of the servomotors 22, and generates a servomotor drive command for driving the servomotors 22 to target stop positions or may oscillate the first and/or second sets of vanes 10 and 12.

When the logic circuit of the "smart" controllers 24 receives servomotor drive commands from the main controller 28 through their LIN transceivers, it transmits drive commands to their motor drivers to rotate the servomotors 22 in the forward or reverse direction so that the servomotors 22 stop at the target stop positions (or oscillate the vanes 10 and 12).

If the detected, present rotation positions of the servomotors 22 arrive at the target stop positions, that is, the present position coincides with the target stop positions, the logic circuit of each "smart" controller 24 transmits stop commands to their motor drivers for stopping the servomotors 22.

In communicating with the main controller 28, the "smart" controllers 24 may transmit to the main controller 28 the present rotation position of the servomotors detected based on the pulse signals P1 and P2 of the absolute encoders 26 while the servomotors 22 are in rotation. The "smart" controllers 24 may also transmit to the main controller 28 stop data indicating the stops of the servomotors 22 when the servomotors 22 have stopped at their target stop positions. The main controller 28 typically checks if the data received from the "smart" controller 24 includes the stop data therein. If the stop data is included, the main controller 28 determines that the servomotors 22 have stopped at their target stop position.

If the stop data indicating the stops of the servomotors 22 are not included, the system controller 28 typically compares the present rotation position of the servomotors 22 received and the present rotation positions of the servomotors 22 received in the previous communications to check whether the present rotation position has changed.

Figure 15:
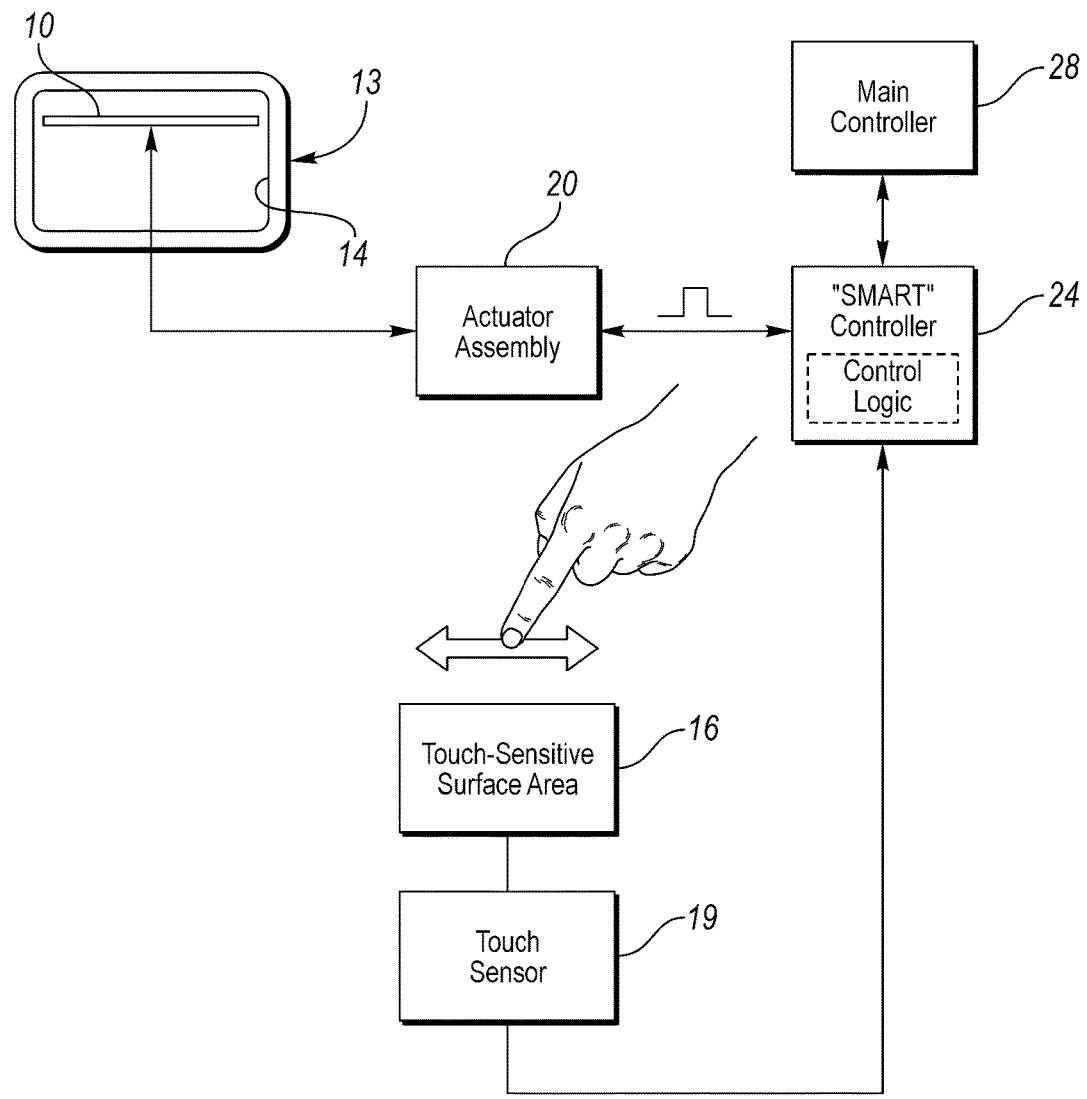
FIG. 15 is a schematic block diagram illustrating touch or gesture control of an air-directing member mounted for movement with an airway of an air outlet housing of a vehicle.

In general, at least one embodiment of the present invention provides a system for controlling air flowing into a passenger compartment of a vehicle. The system includes one or more air outlet assemblies 13, each of which includes a housing 11 (FIG. 11) having an airway 14 and typically mounted in an instrument panel 15 of a vehicle, for fluidly communicating air into the passenger compartment. At least one air-directing member, such as the horizontal vane 10 of FIG. 15, is mounted for movement within the airway 14 and configured to direct a flow of air into the passenger compartment based on position of the at least one member 10 in the airway 14. The system also includes one or more actuator assemblies 20 coupled to the at least one air-directing member 10 to move the at least one air-directing member 10 in the airway 14. One or more discrete, touch-sensitive surface areas 16, 17, and 18 (FIG. 10) function as user touch interface controls.

One or more touch sensors 19, 21, or 23 (FIG. 11) is associated with each touch-sensitive surface area 16, 17 and 18, respectively, and is configured to detect a touch input when a person is touching a touch-sensitive surface area or is close to touching a touch-sensitive surface area as shown in FIGS. 8, 9 and 15.

Control logic within the "smart" controllers 24 is operative to determine a desired value for the position of the at least one member 10 in the airway 14 as a function of the detected touch input and to generate a position control signal based on the desired value. The actuator assembly 20 (which includes a motor 22 and a transmission 40) moves the at least one air-directing member 10 to a desired position in the airway 14 based on the position control signal.

Figure 4:
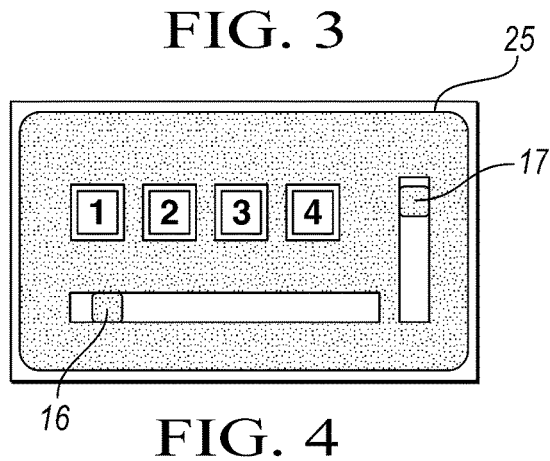
FIG. 4 is a schematic view, having a user interface with multiple, touch-sensitive surface areas.
Figure 5:
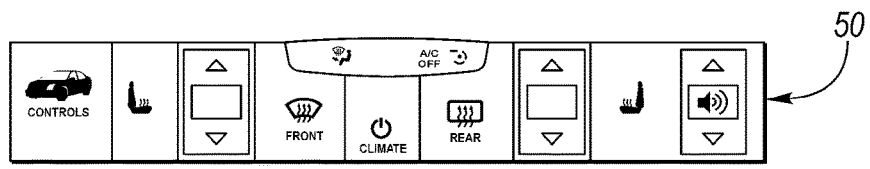
FIG. 5 is a view showing a plurality of icons displayed on a graphical user interface.
Figure 6:
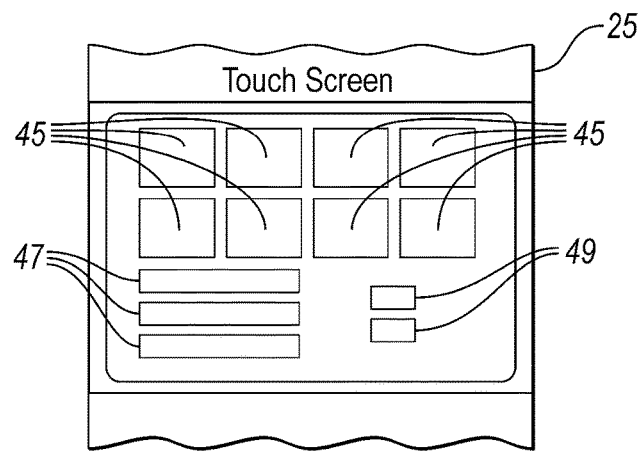
FIG. 6 is a view, partially broken away, of a touch user interface.
Figure 10:
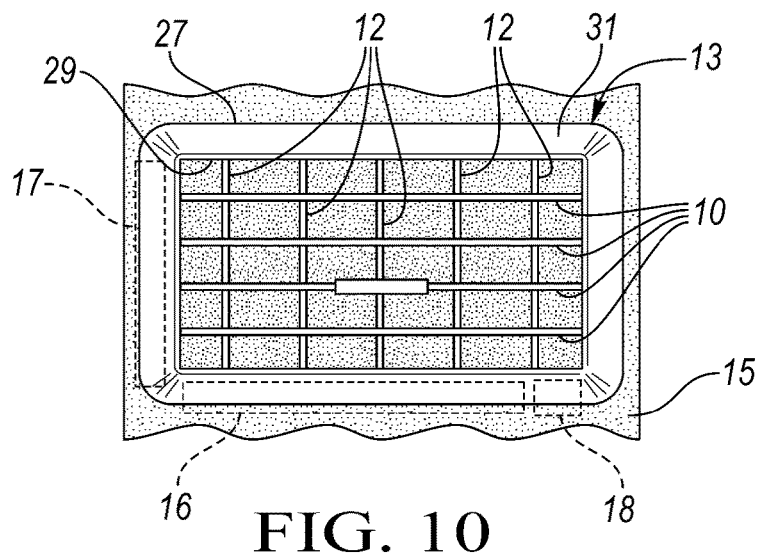
FIG. 10 is a front schematic view, partially broken away, of an air outlet assembly having touch-sensitive surface areas on the outerwardly, passenger-facing surface of its bezel.

The touch-sensitive surface areas 16, 17 and 18 may be adjacent the airway as shown in FIG. 10 or may be part of a centrally located touch screen 25 as shown in FIG. 4. Touch-sensitive surface areas 45, 47 and 49 on a touch screen 25 are shown in FIG. 6 and have different sizes and shapes.

Figure 11:
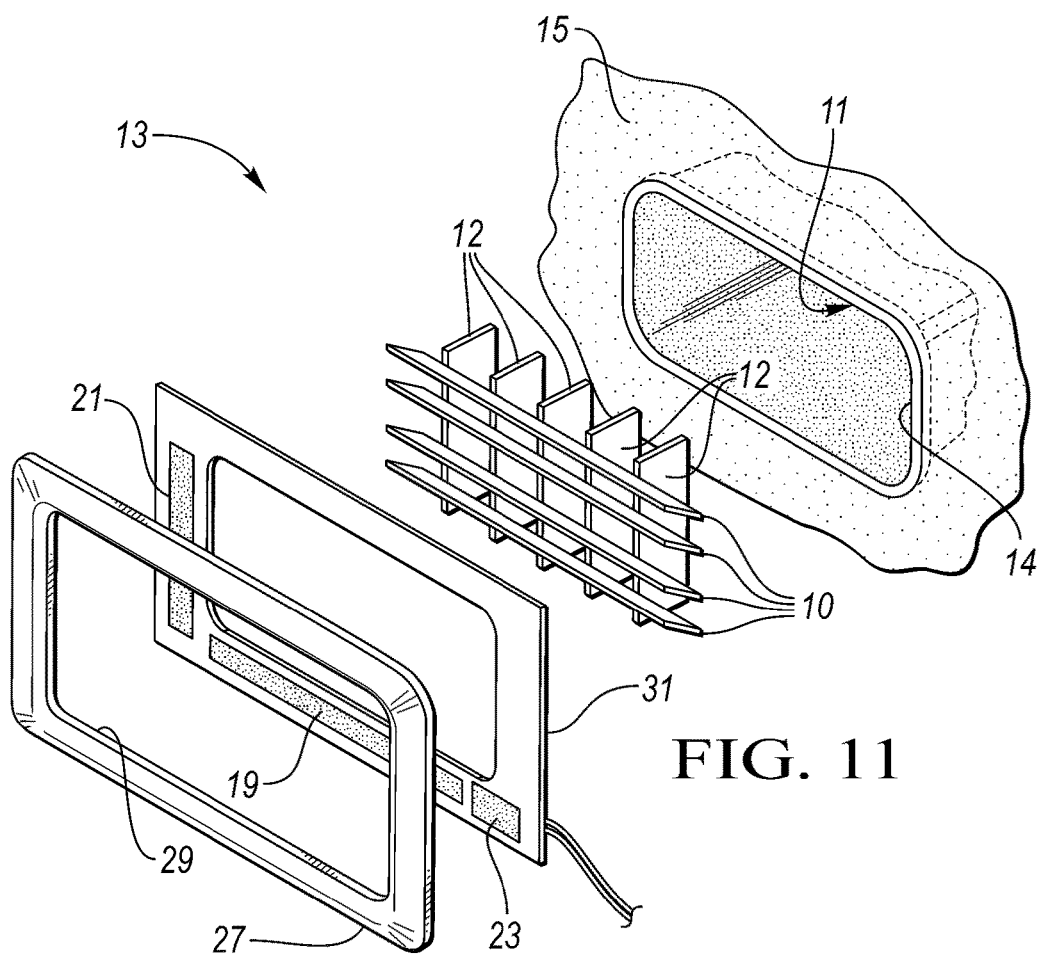
FIG. 11 is an exploded, perspective view of a typical air outlet assembly with a bezel and touch sensors supported on and within a frame of the bezel.

The housing 11 may include a bezel 27 having an opening 29 aligned with the airway 14 and through which the air flows and wherein the touch-sensitive surface areas 16, 17 and 18 may form a portion of an outer surface 31 of the bezel 27 as shown in FIGS. 10 and 11. The bezel 27 may at least partially surround the airway 14 and the touch sensors 19, 21 and 23 are supported by a frame 31 located within the bezel 27 and aligned with the surface areas 16, 17 and 18, respectively.

Figure 2:
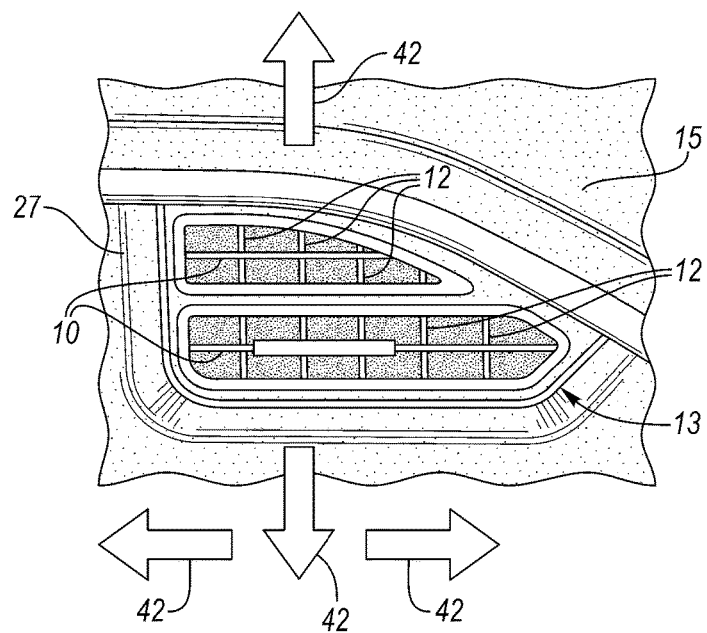
FIG. 2 is an enlarged front view, partially broken away, of a typical air outlet assembly.

The at least one air-directing member 10 may include a vane-like or louver-like air-directing member as shown in FIG. 11. Each air outlet assembly 13 may include a plurality or set of substantially horizontal air-directing members 10 and a plurality or set of substantially vertical air directing members 12 substantially perpendicular with respect to the horizontal air-directing members 10 as shown in FIGS. 2 and 11.

Figure 12:
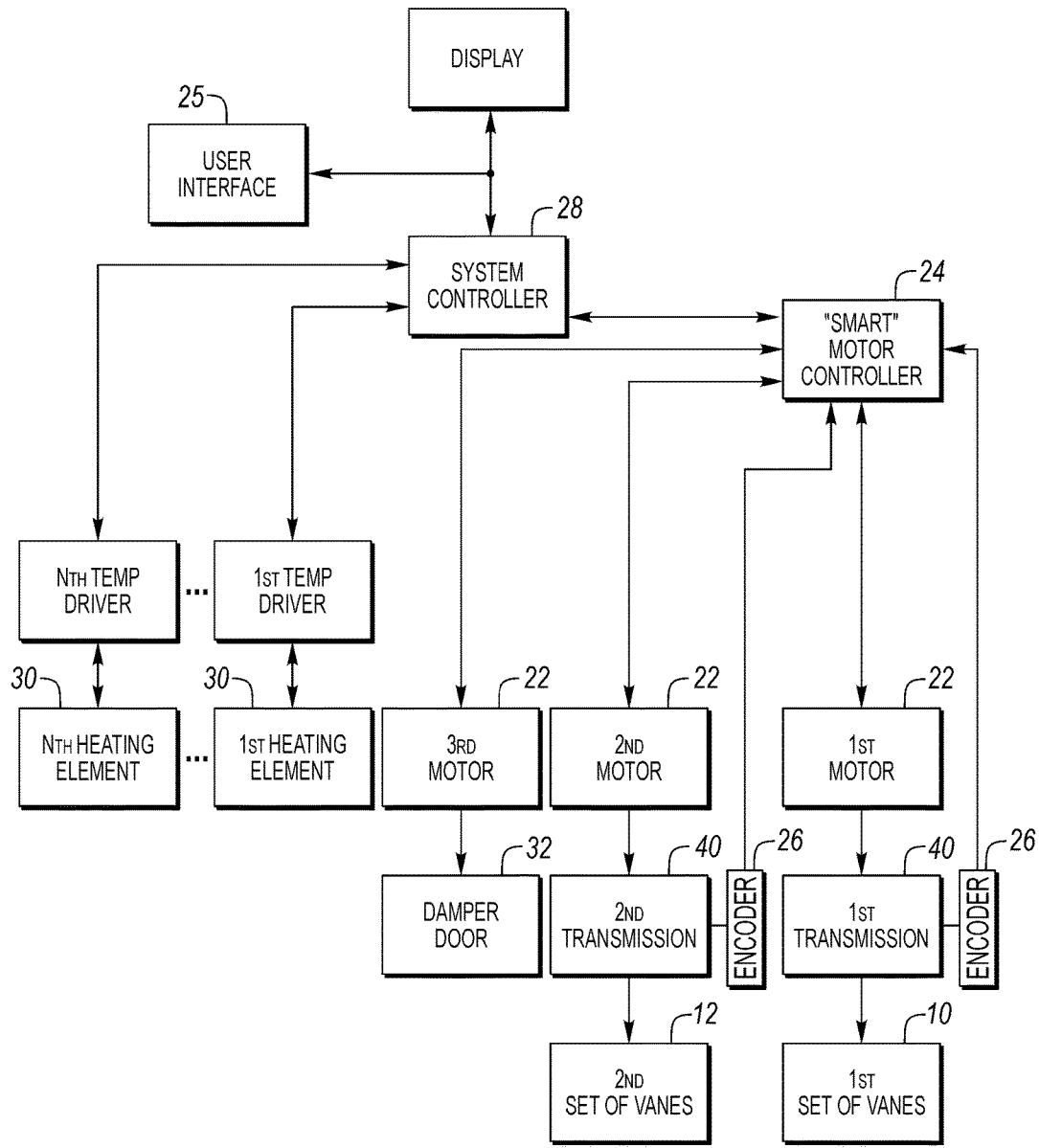
FIG. 12 is a schematic block diagram showing various controllers, actuator assemblies, air-directing members and heating elements.
Figure 13:
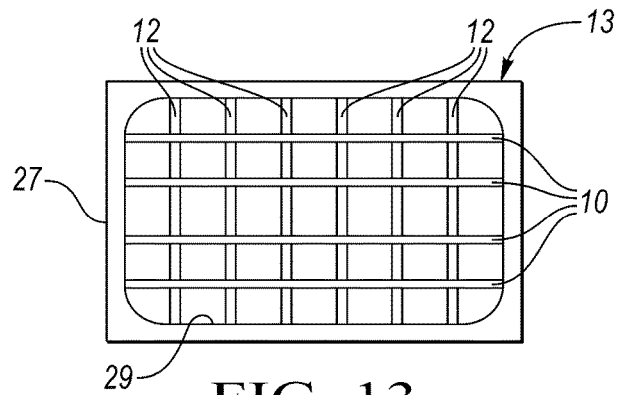
FIG. 13 is a front view of a portion of a touch screen interface having icons representing an air outlet assembly, a bezel and front and rear vanes.

A first actuator assembly including motor 22 and transmission 40 as shown in FIG. 12 may be coupled to the horizontal (first set) air-directing members 10 and a second actuator assembly including motor 22 and transmission 40 may be coupled to the vertical (second set) of air-directing members 12.

The first discrete, touch-sensitive surface area 16 may function as a first touch interface control for the first actuator assembly and the second discrete, touch-sensitive surface area 17 may function as a second touch interface control for the second actuator assembly. The memory device (not shown but included within the controller 24) typically stores a plurality of activation schemes for each air outlet assembly 13. At least one of the activation schemes may be an oscillating mode of the air outlet assemblies 13 wherein one or more air outlet assemblies 13 oscillate the flow of air.

The memory device may store a plurality of predetermined desired values for the positions of the air-directing members 10 and 12 for a passenger of the vehicle wherein the control logic generates position control signals based on the predetermined desired values. The system may provide driver and/or passenger "presets" as shown in FIGS. 3, 4 and 6. The "presets" are typically button icons on the touch screen 25.

Each air outlet assembly 13 may include a door 32 mounted for movement within the airway 14 between open and closed positions. A third actuator assembly (i.e. third motor 22 of FIG. 12) may be coupled to the door 32 (either with or without a transmission) wherein a third discrete, touch-sensitive surface area such as area 18 (FIG. 10) functions as a third touch interface control for the third actuator assembly 22.

The detected touch input may be a gesture as included in FIGS. 8, 9 and 15. The touch sensors 19, 21 and 23 may be integrated within the instrument panel 15 of the vehicle or within the bezel 27 as shown in FIG. 11.

The control logic may determine a desired value of the position of the at least one member 10 in the airway 14 as a function of a signal received by the control logic from a steering wheel control 40 as shown in FIG. 3.

Figure 1:
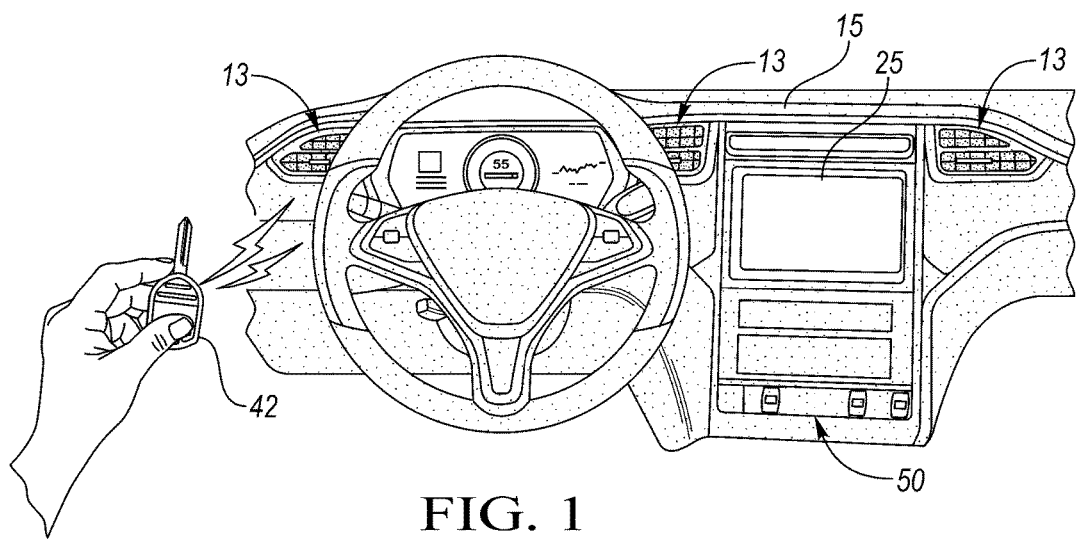
FIG. 1 is an environmental view, partially broken away, of one embodiment of a system for controlling airflow into a passenger compartment of a vehicle and having a key fob input (i.e., remote electronic control unit)

The control logic may determine a desired value for the position of the at least one member 10 in the airway 14 as a function of a signal received from a remote electronic control unit such as the key fob 42 of FIG. 1.

Each actuator assembly (i.e. motor 22 and its transmission 40 for the vanes 10 and 12) may include a servomotor 22 having feedback provided by its encoder 26 for driving the at least one member 10 as previously described.

The encoders 26 are coupled to their servomotors 22 through their transmissions 40 to provide position feedback as a function of the position of the air-directing members 10 and 12. The control logic may control the servomotors 22 based on position command signals. The encoders 26 typically generate a signal based on an initial position of the air-directing members 10 and 12 wherein the actuator assemblies may move the air-directing members 10 and 12 from their initial positions to their desired positions. The actuator assemblies are custom designed for each vehicle brand/type/model, and software controlling the actuator assemblies for each vehicle is also custom. Some additional features of the actuation include self-sensing vane and door location, position locking, incremental movement, multi-driver memory, etc.

Figure 14:
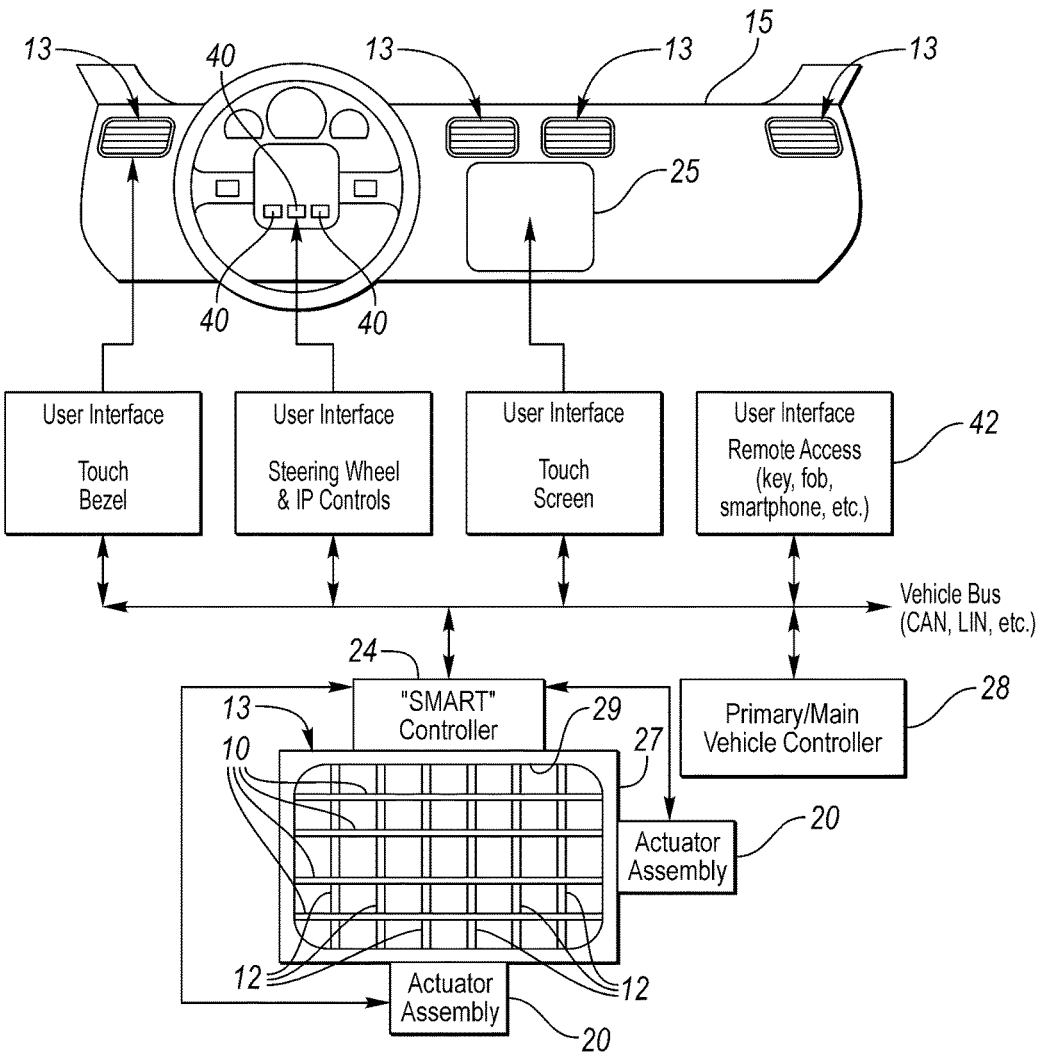
FIG. 14 is a schematic block diagram of a system of at least one embodiment of the invention wherein a vehicle-based bus links various possible user interfaces with one of the controlled air outlet assemblies.

A portion of the control logic may be located in the controller 28 and may be linked to the actuator assemblies through the vehicle-based bus of FIG. 14.

The user touch interface controls may function as a gesturing graphical user interface including icons on screen 25 which represent a plurality of different seating areas 44 and a plurality of different air outlet assemblies 46 for the vehicle as shown in FIGS. 7, 8 and 9. A touch input or gesture as shown in FIG. 8 can change the direction of air flow as shown by arrow 48. A pinch gesture as shown in FIG. 9 can change the mode of airflow to be oscillating.

Referring again to FIGS. 1 and 2, passenger compartment air vents of a vehicle (which may include cars, trucks, tractors, aircraft, etc.) are electronically actuated, controlling airflow through the vents which are designed uniquely for each vehicle brand/type/model, and may be controlled through a touch screen interface 25 having touch sensitive areas of different sizes and shapes 45, 47 and 49, and/or touch sensitive bezels 27, and/or steering wheel controls 40 and/or remote units 42 (e.g. keys, smartphones, etc.). Electronic actuation can include control of primary/front vanes 10 (up/down), secondary/rear vanes 12 (left/right), and/or damper door 32 (open/close), though is not limited to such a configuration. Through electronic actuation the system can control air vents located virtually anywhere in the vehicle. The system changes styling and design dynamics, in that air vents no longer need external factors to direct/control airflow (for example, traditional vanes and doors are not needed), allowing the system to be used in instrument panels 15, headliners, seats, doors, and other non-traditional locations.

Features and functions include: multi-driver/passenger memory presets (FIG. 3 or passengers "1", "2", "3" and "4" in FIG. 4); each air vent assembly 13 can be independently aimed (up, down, left, right as indicated by arrows 42 in FIG. 2); each air vent assembly 13 can be independently shut-off by a door 32; each air vent can oscillate airflow up, down, left, and right via vanes 10 and 12; air vents can oscillate individually, or be grouped (for example, 2 driver, 2 passenger, all front, all rear seat vents); air vents can oscillate at multiple speeds (for example, 10 sec., 20 sec. cycles, etc. which regulates how fast the air is directed/oscillated).

Referring again to FIGS. 3-9, there are illustrated various touch screen user interfaces for use with at least one embodiment of the present invention. Each touch screen interface can control individual air outlets, or groups of air outlets. Controlling up/down, left/right positioning, as well as on/off for each, some, or all air outlets. Each touch screen interface control can also be combined with other instrument panel and steering wheel controls. Each touch screen interface can control air outlets individually or as parts of groups/zones, including air outlets located in instrument panels, headliners, seats, doors, and other non-traditional locations.

Referring again to FIGS. 10 and 11, touch sensors integrated within a bezel or instrument panel, can control up/down movement of front vanes; oscillation and airflow on/off button or touch screen sensor; touch sensors integrated within the bezel or instrument panel, controlling left/right movement of rear vanes. Touch interface controls can also be combined with other instrument panel and steering wheel controls, for group/zone control, driver/passenger memory presets, and other features including oscillation, among others. Touch-sensitive bezel can be used with an air outlet with visible vanes, or with air outlets that have a screen/mesh hiding the internal workings used to direct the airflow. Touch sensitive areas, integrated within the bezel touch sensors can be integrated within bezel itself, or integrated within the instrument panel, controlling up/down, left/right, open/close (if a damper door is present), on/off, and oscillation modes for each air outlet.

Referring again to FIGS. 12-15, each "smart" controller can send/receive commands to/from the main vehicle controller and/or can control individual air outlet actuators directly; controlling up/down, left/right, open/close, on/off, and oscillation modes for each air outlet.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for controlling air flowing into a passenger compartment of a vehicle, the system comprising:
    an air outlet assembly including a housing having an airway for fluidly communicating air into the passenger compartment and at least one air-directing member mounted for movement within the airway and configured to direct a flow of air into the passenger compartment based on position of the at least one member in the airway;
    an actuator assembly coupled to the at least one air-directing member to move the at least one air-directing member in the airway;
    a surface area which functions as a user interface control;
    a touch sensor associated with the surface area and configured to direct air flow responsive to a touch input in the form of a directional gesture applied as a movement parallel to the surface area based on an occupant's finger touching, or in operative proximity to, the touch sensor;
    control logic operative to determine a desired value for the position of the at least one member in the airway as a function of the input and to generate a position control signal based on the desired value, the actuator assembly moving the at least one air-directing member to a desired position in the airway based on the position control signal; and
    a memory device for storing a plurality of activation schemes of the air outlet assembly, wherein at least one of the activation schemes is an oscillation mode of the air outlet assembly and wherein the air outlet assembly oscillates the flow of air upon a directional gesture in the form of a pinching action applied as a movement parallel to the surface area based on multiple fingers of the occupant touching, or in operative proximity to, the touch sensor.

2. The system as claimed in claim 1, wherein the surface area is adjacent the airway.

3. The system as claimed in claim 2, wherein the housing includes a bezel having an opening aligned with the airway and through which the air flows and wherein the surface area forms a portion of an outer surface of the bezel.

4. The system as claimed in claim 3, wherein the bezel at least partially surrounds the airway.

5. The system as claimed in claim 3, wherein the touch sensor is located within the bezel.

6. The system as claimed in claim 1, wherein the at least one air-directing member includes a vane.

7. The system as claimed in claim 1, wherein the air outlet assembly includes a plurality of substantially horizontal air-directing members and a plurality of substantially vertical air directing members substantially perpendicular with respect to the horizontal air-directing members.

8. The system as claimed in claim 7, wherein a first actuator assembly is coupled to the horizontal air-directing members and a second actuator assembly is coupled to the vertical air-directing members.

9. The system as claimed in claim 8, wherein a first surface area functions as a first interface control for the first actuator assembly and a second surface area functions as a second interface control for the second actuator assembly.

10. The system as claimed in claim 1, further comprising a memory device for storing a predetermined desired value for the position of the at least one air-directing member for a passenger of the vehicle wherein the control logic generates a position control signal based on the predetermined desired value.

11. The system as claimed in claim 1, wherein the air outlet assembly includes a door mounted for movement within the airway between open and closed positions.

12. The system as claimed in claim 11, wherein a third actuator assembly is coupled to the door and wherein a third surface area functions as a third interface control for the third actuator assembly.

13. The system as claimed in claim 1, wherein the touch sensor is integrated within an instrument panel of the vehicle.

14. The system as claimed in claim 1, wherein the control logic determines a desired value of the position of the at least one member in the airway as a function of a signal received by the control logic from a steering wheel control.

15. The system as claimed in claim 1, wherein the control logic determines a desired value for the position of the at least one member in the airway as a function of a signal received from a remote electronic control unit.

16. The system as claimed in claim 1, wherein the actuator assembly includes a closed-loop servomotor for driving the at least one member.

17. The system as claimed in claim 16, wherein the actuator assembly includes a sensor coupled to the servomotor to provide position feedback as a function of the position of the at least one air-directing member, the control logic controlling the motor based on the position control signal.

18. The system as claimed in claim 1, further comprising a position sensor to generate a signal based on an initial position of the air-directing member and wherein the actuator assembly moves the at least one air-directing member from the initial position to the desired position.

19. A system for controlling air flowing into a passenger compartment of a vehicle, the system comprising:
a plurality of air outlet assemblies, each of the assemblies including a housing having an airway for fluidly communicating air into the passenger compartment and at least one air-directing member mounted for movement within the airway and configured to direct a flow of air into the passenger compartment based on position of the at least one member in the airway;
an actuator assembly coupled to each air-directing member to move its air-directing member in its airway;
a plurality of surface areas which function as user interface controls;
a touch sensor associated with each surface area and configured to direct air flow responsive to a touch input in the form of a directional gesture applied as a movement parallel to the surface area based on an occupant's finger touching, or in operative proximity to, the touch sensor;
control logic operative to determine a desired value for the position of at least one member in its airway as a function of the input and to generate a position control signal based on the desired value, each actuator assembly moving at least one air-directing member to a desired position in its airway based on its position control signal and wherein the air outlet assemblies are independently controlled by the control logic, and
a memory device for storing a plurality of activation schemes of the air outlet assembly, wherein at least one of the activation schemes is an oscillating mode of the air outlet assembly and wherein the air outlet assembly oscillates the flow of air upon a directional gesture in the form of a pinching action applied as a movement parallel to the surface area based on multiple fingers of the occupant touching, or in operative proximity to, the touch sensor.

20. The system as claimed in claim 16, wherein at least a portion of the control logic is linked to the actuator assemblies through a vehicle-based bus.

21. The system as claimed in claim 19, where the user interface controls function as a gesturing graphical user interface including icons which represent a plurality of different seating areas and a plurality of different air outlet assemblies for the vehicle.

22. The system as claimed in claim 1, wherein the directional gesture indicates to direct the flow of air in accordance with a direction of the gesture.

* * * * *